INVENTORS
PHILIP HENRY WINTERROTH
RICHARD OTTO WAHLER
ROBERT NEAL ROGERS

BY

ATTORNEY

United States Patent Office 3,524,781
Patented Aug. 18, 1970

3,524,781
**APPLICATION OF THIN LINE ADHESIVE
TO A SHEET USING A GROOVED ROLL
AS APPLICATOR**
Philip Henry Winterroth, Island Lake, Richard Otto
Wahler, Rolling Meadows, and Robert Neal Rogers,
Lake Zurich, Ill., assignors to American Can Company, New York, N.Y., a corporation of New Jersey
Filed Mar. 2, 1966, Ser. No. 531,181
Int. Cl. B29d 23/10
U.S. Cl. 156—231                8 Claims

ABSTRACT OF THE DISCLOSURE

An extruded ribbon of thermoplastic is precisely positioned on the marginal edge surface of a sheet. The extruded ribbon is transferred onto the sheet from a cooled roll which has a plurality of grooves about is periphery to prevent lateral displacement of the ribbon to assure that it is placed precisely at the correct location on the sheet.

The present invention relates to the application of adhesive to sheet material, and more particularly to an improved method and apparatus for precisely applying an extruded cement material along a marginal edge portion of a moving sheet used in the manufacturing of containers.

The greatest proportion by far of metal containers used for the packaging of foods and beverages are the familiar three piece tin plate cans which include a hook seam can body with the seal being hermetically sealed by a metallic solder. However, solder sealed can bodies have certain recognized limitations, namely that they must be made from materials which are readily soldered and, in the case of can bodies having lithographed labels, a wide strip on each side of the seam must be maintained free of lithography in order to perform the soldering operation. Numerous developments have been made to overcome these problems by forming the can body seal with an adhesive resin composition, instead of solder.

One of the manufacturing problems with an adhesively bonded can body is the placement of the resin cement in the proper amount and position on the body blank so that when the seam is formed, full bonding will occur without the use of excess material. Precise application of the cement in amount and location is particularly a problem in producing container blanks in a commercially acceptable manner which requires that the resin cement be applied automatically and continuously at a high rate of speed.

Co-pending application, Ser. No. 486,994, filed Sept. 13, 1965 now Pat. No. 3,481,809 discloses a method which is compatible with commercial requirements. In this technique, a ribbon of semi-molten adhesive is extruded onto a transfer roll which then places the adhesive ribbon on the marginal edge portion of the container blank. However, some difficulty has been encountered in lateral displacement of the ribbon upon the transfer roller between the extrusion and the placement of the adhesive ribbon on the container body blank.

It is therefore an object of the present invention to provide an improved method and apparatus for depositing extruded adhesive material on a marginal edge portion of a sheet.

Another object is to apply extruded adhesive cement to seam portions of container body blanks.

A further object is to provide a method and apparatus wherein placement and distribution of the extruded cement on the seam portion of a container body blank is easily and automatically controllable.

Yet another object is to provide an improved apparatus wherein the location and distribution of the cement material on the seam portions of container body blanks could be precisely controlled.

A still further object is to provide an apparatus which will prevent displacement of cement adhesive on the transfer surface between an extruder and the sheet to which the adhesive is to be applied.

Numerous other objects and advantages of the invention will be apparent as it is better understood from the following description, which, taken in connection with the accompanying drawings, discloses a preferred embodiment thereof.

Referring to the drawings.

The above objects are accomplished by extruding a ribbon of semi-molten adhesive onto a plurality of peripheral grooves forming an endless transfer surface, such that the grooves prevent lateral movement of the ribbon on the surface. The transfer surface, generally forming the circumference of a roll, is cooled in order to prevent adherence of the ribbon thereto and facilitate maintaining the adhesive ribbon between the extruder and the transfer surface under tension. Thereafter, the cooled adhesive ribbon is transferred precisely from the peripherally grooved surface to the marginal edge surface of a sheet.

Figure 1:
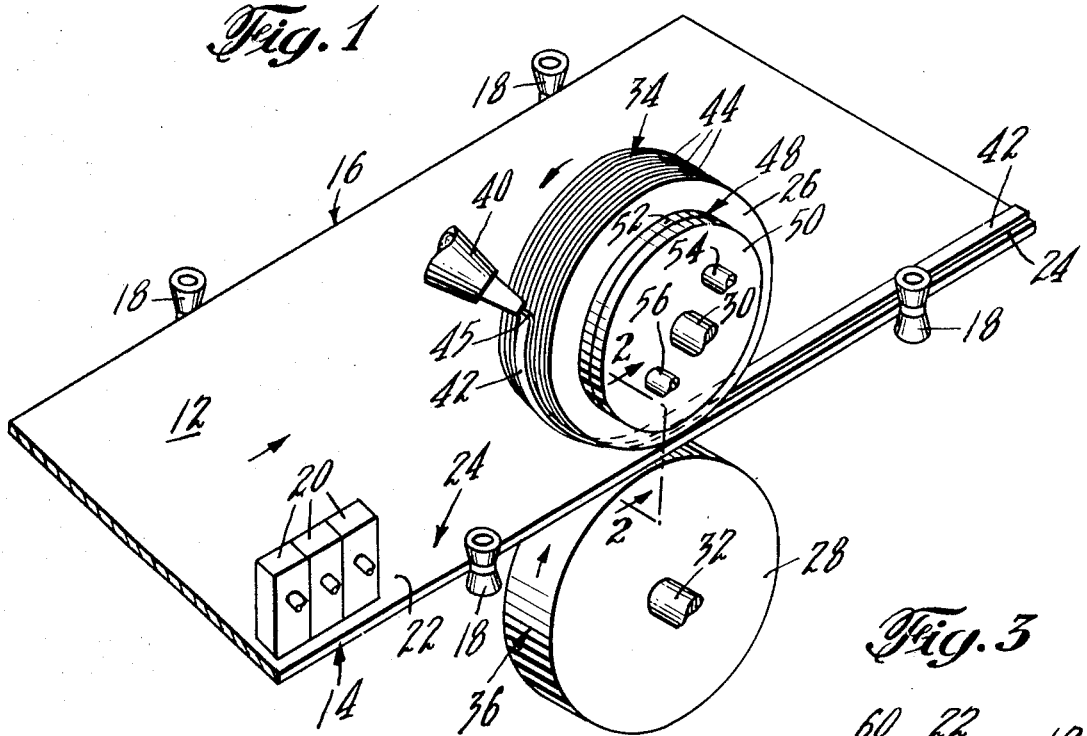
FIG. 1 is a perspective view of an apparatus for applying an adhesive ribbon to the marginal edge portion of a sheet.

As a preferred or exemplary embodiment of the instant invention, FIG. 1 shows a metal sheet 12 moving along a path of travel from left to right as shown. The sheet 12 is moved by conventional conveyor equipment (not shown) well-known to those skilled in the art.

As the sheet 12 is conveyed along the path of travel, side edges 14 and 16 are engaged by guide rollers 18 which move and orient the sheet into a desired position for application of adhesive.

The aligned sheet 12 is conveyed past gas fired radiant heating elements 20 mounted in a position whereby heat is directed against a surface 22 of a side seam marginal edge portion 24 of the sheet adjacent the side edge 14 to heat the surface 22 to a predetermined elevated temperature. The heating elements 20 are provided with suitable valving and controls connected to a temperature sensing device (not shown) to automatically control the temperature to which the marginal edge surface 22 is heated. The means employed to achieve such automatic temperature control may be selected from variable equipment well-known to persons skilled in the art.

Immediately upon leaving the heating elements 20, the marginal edge portion 24 of the sheet 12 passes between a transfer roller 26 and a back-up roller 28. These rollers 26 and 28 are mounted on respective shafts 30 and 32 which are positively driven through a coupling mounted to the conveyor power source so that peripheral speeds of the respective surfaces 34 and 36 are the same as the speed at which the sheet 12 is moved by the conveyor. The rollers 26 and 28 are suitably mounted to provide rolling contact between the surface 36 of the back-up roller 28 and the surface of the marginal edge portion 24 opposite the heated surface 22 and to provide a predetermined spacing between the surface 34 of the transfer roller 26 and the heated marginal surface 22 of the blank.

An extruder 40 positioned adjacent the surface 34 of the transfer roller 26 extrudes, at a substantially uniform rate, a ribbon 42 of an adhesive resin composition. The ribbon 42 is preferably a thermoplastic material which is at an elevated temperature and in a semi-fluid or soft plastic condition when extruded and which hardens to substantially a rigid, relatively non-moveable condition when cooled to normal room temperature.

The surface 34 of the transfer roll 26 has formed therein a plurality of substantially parallel peripheral grooves 44 which will be discussed more fully hereinafter.

Figure 2:
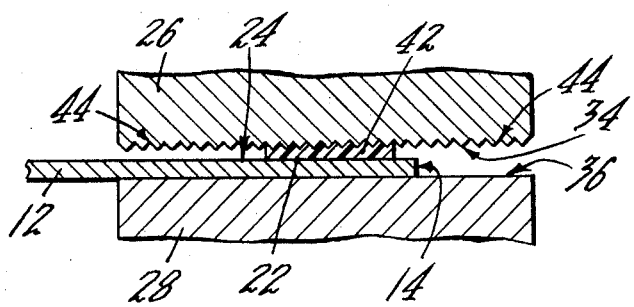
FIG. 2 is an enlarged fragmentary sectional view taken substantially along the line 2—2 of FIG. 1.

Although it is preferred that the rollers 26 and 28 be made of a substantially hard metal such as steel, any relatively rigid material which will maintain its dimensions under pressure may be utilized. Although the cross-sectional profile of the grooved roller 26 is shown as serrated in FIG. 2, such a shape is not required and a cross-sectional profile in the form of a sinusoidal wave with round crests and troughs may also be utilized.

The ribbon 42 is extruded at a reasonably high temperature, such as 500° F., in order to maintain it in the semi-molten condition. This temperature will, of course, vary depending upon the particular adhesive composition used. The ribbon 42 is directed into contact wtih the surface 34 of the transfer roller 26. In its semi-molten extruded form, the ribbon tends to fill the grooves 44 without substantial cohesive force to the roller surface 34. Lateral movement along the surface 34 is also substantially obviated.

It has been found that when it is desired to apply an adhesive ribbon 42 having a thickness of 0.005" to the sheet 12, a groove depth of 0.002" to 0.005" is satisfactory, with a depth preferably 0.003". In addition, the surface 34 is generally chromium coated in order to increase its wear resistance. This also decreases its coefficient of friction and adhesive properties to ease the transfer of adhesive 42 from the surface 34 to the sheet 12.

Preferably, the ribbon 42 is extruded from the extruder 40 at a linear rate which is less than the peripheral speed of the surface 34 of the transfer roller 26. Consequently, a stretching or tension force is exerted on a free portion 45 of the ribbon 42 between the position at which it leaves the extruder 40 and the position at which the ribbon 42 comes into contact with the surface 34 of the transfer roller. The ribbon portion 45 is thereby continuously and substantially uniformly decreased in cross-section to minimize the effects of variations in the cross-section of the ribbon 42 as extruded, resulting from vibrations or pressure fluctuations which may occur during the extruding process. Moreover, the slight tension on the free portion 45 of the extruded ribbon 42 increases the effect of the grooves 44 in preventing transverse or lateral shifting of the extruded ribbon 42 at its point of contact on the roller surface 34.

Additionally, the extruder 40 is positioned with respect to the surface 34 of the transfer roller 26 so as to advance the extruded ribbon 42 in a desired location thereon. Consequently, the ribbon 42 is brought into contact with the heated marginal surface 22 of the sheet 12 along a predetermined area thereon. Thus, the transfer roller 26 carries the ribbon 42 into contact with the heated marginal edge surface 22 of the sheet 12, whereupon the ribbon is placed into engagement with the heated marginal surface between the co-acting rollers 26, 28.

As previously described, the extruded ribbon 42 does not adhere with substantially cohesive force to the grooved surface 34 of the transfer roller 26, but is carried into contact with a predetermined area of the heated marginal edge surface 22 of the sheet 12. Upon being brought into contact with the heated marginal edge surface 22, a cohesive force is created between the marginal edge surface 22 and the extruded ribbon 42 which is much greater than the small cohesive force existing between the extruded ribbon 42 and the grooved surface 34 of the transfer roller 26. The relatively large cohesive force between the extruded ribbon 42 and the heated marginal surface 22 acting in opposition to the lesser cohesive force between the extruded ribbon 42 and the surface 34 of the transfer roller 26 causes the ribbon 42 to be pulled away from the transfer roller 26 and remain in bonding engagement with the marginal edge surface 22 at the desired location thereon.

The temperatures required at the heated marginal surface 22 of the sheet 12, and the surface 34 of the transfer roller 26, in order to get the desired relationship of the cohesive forces between this surface and the extruded ribbon 42 depends upon the character of the thermoplastic material. For the thermoplastic resin compositions generally employed in the manufacture of cemented side seam containers, it has been found that the temperature to which the marginal surface 22 of the sheet 12 must be heated in order to achieve reliable transfer of the extruded ribbon 42 to the sheet 12 will be in the range of 350 to 500° F. Also, the extruded ribbon 42 adequately adheres to the surface 34 of the transfer roller 26, and at the same time may be pulled away from the transfer roller 26 by the forces exerted upon the ribbon 42 by the heated marginal surface 22 of the sheet 12 when the grooved surface 34 of the transfer roller 26 is chilled to a temperature of about 70° F. or less.

In order to achieve the desired control of the temperature of the surface 34 of the transfer roller 26, it is preferable to circulate a coolant internally of the roller. Thus, the transfer roller 26 is provided with internal passages (not shown) and a rotary unit 48 to permit a cooling fluid, such as tap water to be circulated through the passages as the roller revolves. The unit 48 consists of a fixed hub 50 in sliding and sealing engagement with a rotating hub 52 which is attached to one end of the transfer roller 26. Inlet and outlet ports 54 and 56 respectively in the fixed hub 50 connect with channels in the rotating hub 52, which in turn connect with internal cooling passages in the transfer roller 26. The ports 54 and 56 are connected to a water supply and drain respectively, and the flow of water through the transfer roller 26 may be manually or automatically metered to maintain the required temperature on the grooved roller surface 36.

Figure 3:
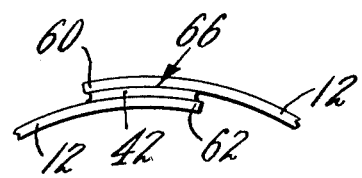
FIG. 3 is an enlarged fragmentary sectional view showing the relationships of container body ends and adhesive prior to formation of the container side seam.
Figure 4:
FIG. 4 is an enlarged fragmentary sectional view of an adhesively bonded container side seam.

After the extruded adhesive ribbon 42 has been applied to the marginal edge surface 22 of the sheet 12, the opposite ends 60, 62 are brought into overlapping relationship to each other such that the ribbon 42 is positioned between the opposite ends 60 and 62 (see FIG. 3). This forms the sheet 12 into an open ended tubular can body. In this operation, a high speed, automatic, can body maker, well-known to those skilled in the art, wraps the sheet 12 around the mandrel, heats the adhesive 42 to a semi-fluid, tacky condition, and presses the opposite ends 60 and 62 together with the tacky adhesive therebetween. Immediately, thereafter, the bonded side seam is chilled to set the adhesive and to secure the lapped margins together to form a can body having a lapped side seam, generally designated 66, shown in FIG. 4. In high speed production, the bonding of the lapped ends is accomplished in less than one second.

From the foregoing description, it is apparent that the present invention provides a simple and efficient method and apparatus for applying a predetermined amount of a thermoplastic adhesive material in a precise location on the side seam marginal edge portion of a body blank. The grooved transfer roller substantially prevents lateral or transverse movement of the thermoplastic ribbon on the transfer roller surface between its extrusion in a semi-molten state and its application to the marginal edge portion of a sheet. Thus, the adhesive ribbon placed on the marginal edge portion of either sheet will be in precisely the same location, so that high speed automated commercial equipment may produce identically side seamed containers at low cost.

It is thought that the invention and many of its attendant advantages will be understood from the foregoing description and it will be apparent that various changes may be made in the form, construction and arrangement of the parts mentioned herein and in the steps of the order of accomplishment of the process described herein, without departing from the spirit and scope of the invention, or sacrificing all of its material advantages, the purpose and process hereinbefore described being merely a preferred embodiment thereof.

We claim:

1. A method of precisely positioning a ribbon of thermoplastic adhesive upon a selected portion of the marginal edge surface of a sheet, comprising the steps of:

rotating a plurality of peripheral grooves which form an endless transfer surface, said grooves adjacently positioned in planes substantially parallel to each other and to the direction of rotation with a selected portion of said grooves aligned with the selected portion of the marginal edge surface of the sheet;

extruding the adhesive ribbon in a semi-molten condition into contact with the selected portion of the grooves, portions of the adhesive ribbon extending into said selected portion of the grooves such that said grooves prevent lateral movement of the adhesive ribbon on the rotating transfer surface;

maintaining the adhesive ribbon between the extruder and the rotating transfer surface under tension to prevent lateral shifting of the extruded adhesive ribbon away from its selected position of contact with the rotating transfer surface;

cooling the adhesive ribbon on the rotating transfer surface; and transferring the cooled adhesive ribbon from the rotating transfer surface to the selected portion of the marginal edge surface of the sheet.

2. The method of claim 1 wherein the cross-sectional profile of said grooves has a serrated shape.

3. The method of claim 1 wherein said adhesive is cooled below its extrusion temperature, but is maintained in the semi-molten state, on said transfer surface.

4. In an apparatus for precisely positioning a ribbon of thermoplastic adhesive upon a selected portion of the marginal edge surface of a sheet, wherein said adhesive ribbon is first extruded onto a transfer surface, and is then transferred to said selected portion of the sheet edge, an endless transfer body comprising:

a rotatable substantially rigid body;

a plurality of peripheral grooves forming the outer surface of said body to prevent lateral movement of the adhesive ribbon on said outer surface, said grooves adjacently positioned in planes substantially parallel to each other and to the direction of rotation of said rotatable body with a selected portion of said grooves aligned with the selected portion of the marginal edge surface of the sheet; and means interiorly of said body to cool the outer surface of said body.

5. The apparatus of claim 4 wherein the cross-sectional profile of said peripheral grooves is serrated.

6. The apparatus of claim 4 wherein the cross-sectional profile of said peripheral grooves has a sinusoidal shape.

7. The apparatus of claim 4 wherein said peripheral grooves have a depth of from 0.002" to 0.005".

8. The apparatus of claim 4 wherein said outer surface of said transfer body is coated with chromium.

References Cited

UNITED STATES PATENTS

| | | | |
|---|---|---|---|
| 2,795,521 | 6/1956 | Blackford | 156—244 |
| 3,056,164 | 10/1962 | Reichel et al. | 226—193 X |
| 3,075,864 | 1/1963 | Anderson | 156—244 X |
| 3,106,319 | 10/1963 | Fischer | 226—193 |
| 2,799,610 | 7/1957 | Magill | 156—218 X |
| 3,317,334 | 5/1967 | Norton | 117—10 |
| 3,329,740 | 7/1967 | Battersby | 260—860 |

JOHN T. GOOLKASIAN, Primary Examiner

J. C. GIL, Assistant Examiner

U.S. Cl. X.R.

113—120; 118—211; 156—203, 218, 232, 244, 500; 220—80